United States Patent
Wei et al.

(10) Patent No.: US 11,473,217 B2
(45) Date of Patent: Oct. 18, 2022

(54) TEMPERATURE REGULATING NYLON FIBER

(71) Applicant: TAIWAN TEXTILE RESEARCH INSTITUTE, New Taipei (TW)

(72) Inventors: Chi-Shu Wei, New Taipei (TW); Yen-Hsi Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 230 days.

(21) Appl. No.: 17/097,002

(22) Filed: Nov. 13, 2020

(65) Prior Publication Data

US 2021/0363664 A1    Nov. 25, 2021

(30) Foreign Application Priority Data

May 19, 2020    (TW) .................. 109116559

(51) Int. Cl.
*D01F 8/12*    (2006.01)
*D01F 1/10*    (2006.01)
*C09K 5/06*    (2006.01)

(52) U.S. Cl.
CPC ............... *D01F 1/10* (2013.01); *C09K 5/06* (2013.01); *D01F 8/12* (2013.01); *D10B 2401/04* (2013.01)

(58) Field of Classification Search
CPC ...................................................... D01F 8/12
See application file for complete search history.

(56) References Cited

U.S. PATENT DOCUMENTS

| | | |
|---|---|---|
| 7,241,497 B2 | 7/2007 | Magill et al. |
| 7,579,078 B2 | 8/2009 | Hartmann et al. |
| 8,404,341 B2 | 3/2013 | Hartmann et al. |
| 10,577,725 B2 | 3/2020 | Kurihara et al. |
| 2005/0208286 A1 | 9/2005 | Hartmann et al. |
| 2006/0235151 A1 | 10/2006 | Lin |
| 2007/0089276 A1 | 4/2007 | Dugan et al. |
| 2009/0093606 A1* | 4/2009 | Hu ................. C08G 18/664 528/48 |
| 2010/0016513 A1 | 1/2010 | Hartmann et al. |
| 2010/0171067 A1* | 7/2010 | Hu .................. C08G 18/10 528/68 |
| 2017/0002175 A1 | 1/2017 | Hsu et al. |

FOREIGN PATENT DOCUMENTS

| | | |
|---|---|---|
| CN | 1471595 A | 1/2004 |
| CN | 1602372 A | 3/2005 |
| CN | 102124072 A | 7/2011 |
| EP | 1846598 B1 | 5/2012 |
| TW | 200636008 A | 10/2006 |
| TW | 200641003 A | 12/2006 |
| TW | 312798 B | 8/2009 |
| TW | 201129739 A1 | 9/2011 |
| TW | 201621114 A | 6/2016 |
| TW | 582278 B | 5/2017 |
| WO | 2007119652 A | 8/2009 |

* cited by examiner

*Primary Examiner* — Andrew T Piziali

(74) *Attorney, Agent, or Firm* — McClure, Qualey & Rodack, LLP

(57) ABSTRACT

A temperature regulating nylon fiber includes a fiber body and a phase change composition. The phase change composition is doped in the fiber body and includes 450 parts by weight to 550 parts by weight of a polytetrahydrofuran derivative and 5 parts by weight to 20 parts by weight of a succinic anhydride derivative. Based on 100 parts by weight of the temperature regulating nylon fiber, a content of the phase change composition is between 6 parts by weight and 12 parts by weight.

10 Claims, No Drawings

TEMPERATURE REGULATING NYLON FIBER

RELATED APPLICATIONS

This application claims priority to Taiwan Application Serial Number 109116559, filed May 19, 2020, which is herein incorporated by reference.

BACKGROUND

Field of Invention

The present disclosure relates to a nylon fiber, and particularly relates to a nylon fiber having a temperature regulating property.

Description of Related Art

In recent years, global greenhouse effect has caused extreme climate changes, and extremely cold and hot climates have also changed the clothing style. Accordingly, technologies have been introduced into conventional clothing to strengthen the warmth retention property thereof. A phase change material is a substance which can undergo phase conversion within a specific temperature range, which is often accompanied by absorbing or releasing a large amount of latent heat during the phase conversion process. The most important feature of the phase change material is that when it absorbs or releases a large amount of latent heat, the temperature of the environment nearby can still be maintained within a certain range. Therefore, the phase change material is often applied to related fields of thermal fabrics. However, how to overcome the limitations when introducing the phase change material into fabrics is still an important issue in the textile industry.

SUMMARY

An aspect of the present disclosure relates in general to a temperature regulating nylon fiber, which is suitable for applying to fabrics to make the fabrics achieve a good warmth retention effect.

According to some embodiments of the present disclosure, the temperature regulating nylon fiber includes a fiber body and a phase change composition. The phase change composition is doped in the fiber body and includes 450 parts by weight to 550 parts by weight of a polytetrahydrofuran derivative and 5 parts by weight to 20 parts by weight of a succinic anhydride derivative. Based on 100 parts by weight of the temperature regulating nylon fiber, a content of the phase change composition is between 6 parts by weight and 12 parts by weight.

In some embodiments of the present disclosure, a phase change temperature of the phase change composition is between 21° C. and 29° C.

In some embodiments of the present disclosure, a latent heat of the phase change composition is between 60 J/g and 95 J/g.

In some embodiments of the present disclosure, an initial pyrolysis temperature of the phase change composition is between 260° C. and 330° C., and a maximum pyrolysis temperature of the phase change composition is between 350° C. and 410° C.

In some embodiments of the present disclosure, a weight average molecular weight of the polytetrahydrofuran derivative is between 1800 g/mole and 3200 g/mole.

In some embodiments of the present disclosure, a weight average molecular weight of the phase change composition is between 20000 g/mole and 30000 g/mole.

In some embodiments of the present disclosure, the phase change composition includes 9 parts by weight to 20 parts by weight of a maleic anhydride derivative.

In some embodiments of the present disclosure, the phase change composition includes 0.25 parts by mole to 0.99 parts by mole of a first structural unit and 0.01 parts by mole to 0.75 parts by mole of a second structural unit. The first structural unit is represented by formula (1),

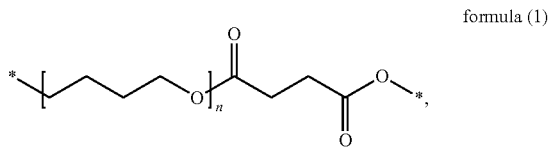

and the second structural unit is represented by formula (2),

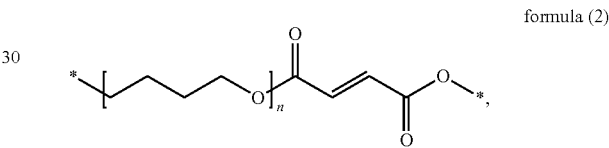

in which n is a positive integer between 25 and 48.

In some embodiments of the present disclosure, the phase change composition includes 10 parts by weight to 25 parts by weight of a linear fatty acid derivative.

In some embodiments of the present disclosure, the phase change composition includes 0.40 parts by mole to 0.80 parts by mole of a first structural unit, 0.01 parts by mole to 0.40 parts by mole of a second structural unit, and 0.18 parts by mole to 0.22 parts by mole of a third structural unit. The first structural unit is represented by formula (1),

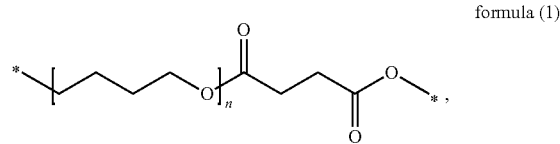

the second structural unit is represented by formula (2),

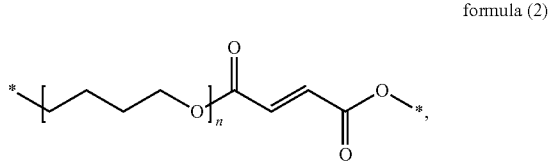

and the third structural unit is represented by formula (3),

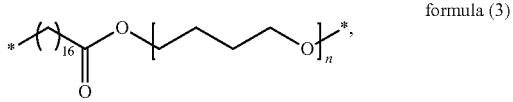

formula (3)

in which n is a positive integer between 25 and 48.

In the aforementioned embodiments of the present disclosure, since the temperature regulating nylon fiber of the present disclosure includes the fiber body and a specific amount of the phase change composition doped in the fiber body, and the phase change composition further includes a specific amount of the polytetrahydrofuran derivative and the succinic anhydride derivative, the temperature regulating nylon fiber of the present disclosure has a good temperature regulating property, and thus can be applied to related fields of wearable thermal fabrics.

DETAILED DESCRIPTION

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

The present disclosure provides a temperature regulating nylon fiber including a fiber body and a phase change composition doped in the fiber body. Since the phase change composition is doped in the fiber body by a specific amount, and the phase change composition further includes a specific amount of a polytetrahydrofuran derivative and a succinic anhydride derivative, the temperature regulating nylon fiber of the present disclosure has a good temperature regulating property, such that the temperature regulating fabric therethrough has a good warmth retention property.

The temperature regulating nylon fiber includes the fiber body and the phase change composition. A base material of the fiber body is nylon. The phase change composition is doped in the fiber body by a specific amount to provide a good temperature regulating property to the temperature regulating nylon fiber. Specifically, based on 100 parts by weight of the temperature regulating nylon fiber, a content of the phase change composition is between 6 parts by weight and 12 parts by weight. In addition, the phase change composition includes 450 parts by weight to 550 parts by weight of the polytetrahydrofuran derivative and 5 parts by weight to 20 parts by weight of the succinic anhydride derivative, thereby having suitable latent heat and phase change temperature.

In some embodiments, a weight average molecular weight of the phase change composition may be between 20000 g/mole and 30000 g/mole, such that the phase change composition can have good compatibility with the fiber body, thereby providing good fiber morphology to the temperature regulating nylon fiber. In addition, the phase change composition with the above weight average molecular weight can have good heat resistance, so as to avoid pyrolysis and flashover during the melt-spinning process to ensure the safety and stability of the manufacturing process. Furthermore, the phase change composition with the above weight average molecular weight may undergo phase conversion between a solid state and an elastomer (colloid) state, so as to be directly doped in the fiber body to provide a single-component temperature regulating nylon fiber. In detail, the phase conversion of the conventional phase change materials usually occurs between solid and liquid states, and while concerning the problem of liquid leakage, it is often necessary to coat the phase change materials in microcapsules before introducing it into the fiber body, or it is often necessary to make the phase change materials into a two-component fiber (e.g., a sheath-core fiber) to overcome the problem of liquid leakage. Therefore, compared to the conventional phase change materials, since the phase conversion of the phase change composition of the present disclosure occurs between the solid and elastomer (colloid) states, it can be made into a single-component temperature regulating nylon fiber. Accordingly, the manufacturing process of the temperature regulating nylon fiber is simplified, and the user is provided with portability and comfort. In addition, since the phase conversion of the phase change composition of the present disclosure occurs between the solid and elastomer (colloid) states, it can avoid the greasiness on the surface of the fiber body due to melting migration during the melt-spinning process, thereby improving the convenience of the finishing processing (e.g., improving the dyeability of fibers).

The phase change composition includes 450 parts by weight to 550 parts by weight of the polytetrahydrofuran derivative and 5 parts by weight to 20 parts by weight of the succinic anhydride derivative. Specifically, the phase change composition may include a first structural unit represented by formula (1),

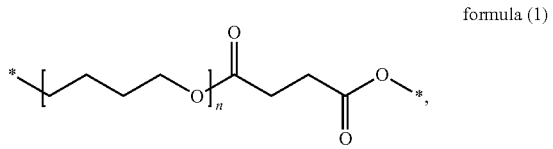

formula (1)

in which n is a positive integer between 25 and 48. Since the polytetrahydrofuran derivative has a linear structure, the phase change composition formed by the polytetrahydrofuran derivative can be induced to have a linear structure, which can increase the intermolecular force between the polymers and increase the latent heat during the phase conversion. In some embodiments, a weight average molecular weight of the polytetrahydrofuran derivative may be between 1800 g/mole and 3200 g/mole to provide good reactivity for its precursor (e.g., polytetrahydrofuran), such that the phase change composition formed by the precursor has the aforementioned suitable weight average molecular weight.

In some embodiments, the phase change composition may further include 9 parts by weight to 20 parts by weight of a maleic anhydride derivative. Specifically, the phase change composition includes 0.25 parts by mole to 0.99 parts by mole of a first structural unit and 0.01 parts by mole to 0.75 parts by mole of a second structural unit, in which the first structural unit is represented by formula (1),

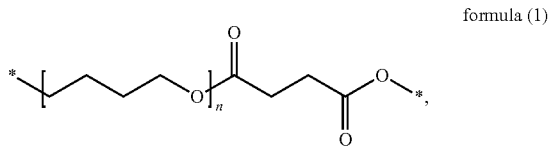

formula (1)

the second structural unit is represented by formula (2),

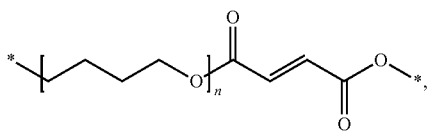

formula (2)

and n is a positive integer between 25 and 48. As such, the phase change composition having the maleic anhydride derivative can provide a good temperature regulating property, and can have the various advantages as those of the aforementioned phase change composition.

In some embodiments, the phase change composition may further include 10 parts by weight to 25 parts by weight of a linear fatty acid derivative. Specifically, the phase change composition includes 0.40 parts by mole to 0.80 parts by mole of a first structural unit, 0.01 parts by mole to 0.40 parts by mole of a second structural unit, and 0.18 parts by mole to 0.22 parts by mole of a third structural unit, in which the first structural unit is represented by formula (1),

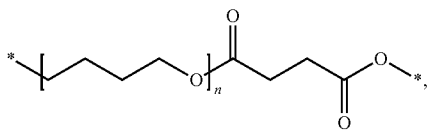

formula (1)

the second structural unit is represented by formula (2),

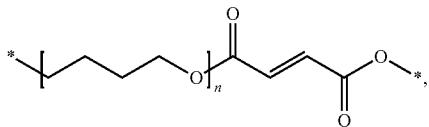

formula (2)

the third structural unit is represented by formula (3),

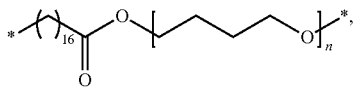

formula (3)

and n is a positive integer between 25 and 48. Since the linear fatty acid derivative has a linear structure, the latent heat during the phase conversion is increased. The phase change composition having the linear fatty acid derivative can provide a good temperature regulating property, and can have the various advantages as those of the aforementioned phase change composition.

In some embodiments, a polytetrahydrofuran, a succinic anhydride, a maleic anhydride, and/or a linear fatty acid derivative may be mixed by the above ratio and dissolved in a suitable amount of toluene to undergo an esterification reaction, and thus the phase change composition can be obtained. In some embodiments, the phase change composition can be ensured to have a linear structure by adjusting the addition amount of the succinic anhydride to be greater than the addition amount of the maleic anhydride, thereby enhancing the latent heat during the phase conversion. In some embodiments, the reaction can be prompted to proceed fast and completely by adding a protonic acid and being performed under an azeotropic reflux reaction.

In some embodiments, a phase change temperature of the phase change composition may be between 21° C. and 29° C., thereby providing suitable phase change temperature for the temperature regulating nylon fiber, so as to be applied to products such as wearable thermal fabrics, and meet the wearing needs of the users. Specifically, in some embodiments, a phase change temperature of the temperature regulating nylon fiber may be between 27° C. and 29° C. In some embodiments, a latent heat of the phase change composition may be between 60 J/g and 95 J/g. As such, during the phase conversion process, the phase change composition can have a characteristic of absorbing a certain amount of heat to achieve a good temperature buffering effect, and further make the temperature regulating nylon fiber have a good temperature regulating property. Specifically, in some embodiments, an enthalpy of the temperature regulating nylon fiber may be between 3 J/g and 8 J/g within the phase change temperature range of the phase change composition.

In some embodiments, an initial pyrolysis temperature of the phase change composition may be between 260° C. and 330° C., and a maximum pyrolysis temperature of the phase change composition may be between 350° C. and 410° C. The phase change composition with the above pyrolysis temperature can have good heat resistance, so as to avoid pyrolysis and flashover during the melt-spinning process to ensure the safety and stability of the manufacturing process. In some embodiments, a viscosity of the phase change composition may be between 14000 cP and 15000 cP at a temperature of 56° C., such that the phase change composition has good spinnability to produce a temperature regulating nylon fiber with high yield rate.

In the following descriptions, multiple embodiments and comparative examples are listed to verify the efficacies of the present disclosure. Embodiments 1 to 5 are the phase change compositions of the present disclosure, and embodiments 6 to 9 are the temperature regulating nylon fibers of the present disclosure. In detail, the temperature regulating nylon fibers of embodiments 6 to 9 are respectively fabricated by doping the phase change composition of embodiment 4 into the fiber body by different contents. In addition, comparative example 1 is a commercially available phase change material, and comparative example 2 is a commercially available polyester fiber. The components and contents of each embodiment and comparative example are shown in Table 1.

TABLE 1

| | polytetrahydrofuran derivative | succinic anhydride derivative | maleic anhydride derivative | linear fatty acid derivative |
|---|---|---|---|---|
| embodiment 1 | 500 (M.W. 2000) | 12.51 | 12.25 | 0 |
| embodiment 2 | 500 (M.W. 2000) | 6.25 | 18.38 | 0 |
| embodiment 3 | 500 (M.W. 2000) | 10.01 | 9.80 | 14.22 |
| embodiment 4 | 500 (M.W. 3000) | 16.68 | 0 | 0 |
| embodiment 5 | 500 (M.W. 3000) | 8.34 | 0 | 23.71 |

TABLE 1-continued

| comparative example 1 | commercially available phase change material: octadecane |
|---|---|

| | contents of the phase change composition of embodiment 4 (based on 100 parts by weight of the fiber) |
|---|---|
| embodiment 6 | 6 |
| embodiment 7 | 8 |
| embodiment 8 | 10 |
| embodiment 9 | 12 |
| comparative example 2 | 0 |

Note 1:
the unit of the content of each component is parts by weight
Note 2:
the temperature regulating nylon fibers of embodiments 6 to 9 are continuous filament with single component
Note 3:
the polyester fiber of comparative example 2 is a sheath-core short fiber with two components, in which the phase change material is in the core layer and is octadecane
Note 4:
the term "M.W." stands for "molecular weight"

<Experiment 1: Thermal Property Analysis for the Phase Change Composition>

In this experiment, the main phase change temperature and the enthalpy (latent heat) of the phase change compositions of embodiments 1 to 5 and the phase change material of comparative example 1 are measured through differential scanning calorimetry (DSC), and the pyrolysis temperature of the phase change compositions of embodiments 1 to 5 and the phase change material of comparative example 1 are measured through thermogravimetric analysis (TGA). The measurement results are shown in Table 2.

TABLE 2

| | main phase change temperature (° C.) | enthalpy (J/g) | initial pyrolysis temperature (° C.) | maximum pyrolysis temperature (° C.) |
|---|---|---|---|---|
| embodiment 1 | 22.8 | 64.80 | 282 | 370 |
| embodiment 2 | 23.1 | 64.40 | 327 | 410 |
| embodiment 3 | 21.0 | 69.30 | 266 | 350 |
| embodiment 4 | 28.1 | 93.30 | 313 | 408 |
| embodiment 5 | 27.9 | 86.39 | 290 | 390 |
| comparative example 1 | 30.7 | 213.7 | 90 | 151 |

As shown in Table 2, the phase change compositions of embodiments 1 to 5 have appropriate phase change temperature and certain enthalpy (latent heat) to meet the wearing needs of the users and be able to achieve a good temperature buffering effect. In addition, compared to the phase change material of comparative example 1, the phase change compositions of embodiments 1 to 5 have significantly larger initial pyrolysis temperature and maximum pyrolysis temperature, indicating that the phase change compositions of embodiments 1 to 5 have better heat resistance, thus avoiding pyrolysis and flashover during the melt-spinning process to ensure the safety and stability of the manufacturing process, and hence improve the yield rate of the temperature regulating nylon fiber.

<Experiment 2: Thermal Property Analysis of the Fiber>

In this experiment, the main phase change temperature, the enthalpy, the fiber strength, the fiber drawing ratio, and the fiber fitness of the temperature regulating nylon fibers of embodiments 6 to 9 and/or the polyester fiber of comparative example 2 are measured. The measurement results are shown in Table 3.

TABLE 3

| | main phase change temperature (° C.) | enthalpy (J/g) | fiber strength (g/d) | fiber drawing ratio (%) | fiber fitness (d/24f) |
|---|---|---|---|---|---|
| embodiment 6 | 27.9 | 3.01 | 3.92 | 50.7 | 70.9 |
| embodiment 7 | 28.3 | 4.51 | 3.74 | 51.9 | 70.7 |
| embodiment 8 | 28.4 | 6.81 | 3.69 | 35.8 | 95.1 |
| embodiment 9 | 28.1 | 7.37 | 3.49 | 49.8 | 79.1 |
| comparative example 2 | 26.4/32.9 | 0.29/0.57 | N/A | N/A | N/A |

Note 1:
the polyester fiber of comparative example 2 has two main phase change temperature and two corresponding enthalpy As shown in Table 3, the temperature regulating nylon fibers of embodiments 6 to 9 have suitable phase change temperature to meet the wearing needs of the users. In addition, compared to the polyester fiber of example 2, the temperature regulating nylon fibers of embodiments 6 to 9 have significantly larger enthalpy, indicating that the temperature regulating nylon fibers of embodiments 6 to 9 have better heat resistance to achieve a better temperature regulating property. In embodiments 6 to 9, the fiber strength may be between 3.4 g/d and 4.0 g/d, the fiber drawing ratio may be between 35% and 52%, and the fiber fitness may be between 70d/24f and 96d/24f, indicating that the temperature regulating nylon fiber of the present disclosure meet the industrial standards and has good applicability.

According to the aforementioned embodiments of the present disclosure, the temperature regulating nylon fiber of the present disclosure includes the fiber body and the phase change composition doped in the fiber body. The phase change composition includes the polytetrahydrofuran derivative and the succinic anhydride derivative, and may optionally include the maleic anhydride derivatives and the linear fatty acid derivative. The phase change composition of the present disclosure has good heat resistance and phase conversion between solid and elastomer (colloid) states, thereby providing high manufacturing convenience for the temperature regulating nylon fiber. In addition, the fabric fabricated by the temperature regulating nylon fiber of the present disclosure can achieve a good warmth retention effect and portability.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A temperature regulating nylon fiber, comprising:
a fiber body; and
a phase change composition doped in the fiber body, the phase change composition comprises:
450 parts by weight to 550 parts by weight of a polytetrahydrofuran derivative; and
5 parts by weight to 20 parts by weight of a succinic anhydride derivative,
wherein based on 100 parts by weight of the temperature regulating nylon fiber, a content of the phase change composition is between 6 parts by weight and 12 parts by weight.

2. The temperature regulating nylon fiber of claim 1, wherein a phase change temperature of the phase change composition is between 21° C. and 29° C.

3. The temperature regulating nylon fiber of claim 1, wherein a latent heat of the phase change composition is between 60 J/g and 95 J/g.

4. The temperature regulating nylon fiber of claim 1, wherein an initial pyrolysis temperature of the phase change composition is between 260° C. and 330° C., and a maximum pyrolysis temperature of the phase change composition is between 350° C. and 410° C.

5. The temperature regulating nylon fiber of claim 1, wherein a weight average molecular weight of the polytetrahydrofuran derivative is between 1800 g/mole and 3200 g/mole.

6. The temperature regulating nylon fiber of claim 1, wherein a weight average molecular weight of the phase change composition is between 20000 g/mole and 30000 g/mole.

7. The temperature regulating nylon fiber of claim 1, wherein the phase change composition comprises 9 parts by weight to 20 parts by weight of a maleic anhydride derivative.

8. The temperature regulating nylon fiber of claim 7, wherein the phase change composition comprises:
0.25 parts by mole to 0.99 parts by mole of a first structural unit, the first structural unit is represented by formula (1),

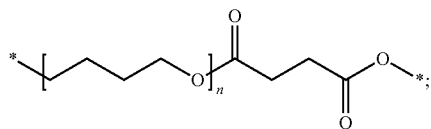

formula (1)

and
0.01 parts by mole to 0.75 parts by mole of a second structural unit, the second structural unit is represented by formula (2),

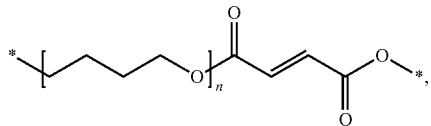

formula (2)

wherein n is a positive integer between 25 and 48.

9. The temperature regulating nylon fiber of claim 1, wherein the phase change composition comprises 10 parts by weight to 25 parts by weight of a linear fatty acid derivative.

10. The temperature regulating nylon fiber of claim 9, wherein the phase change composition comprises:
0.40 parts by mole to 0.80 parts by mole of a first structural unit, the first structural unit is represented by formula (1),

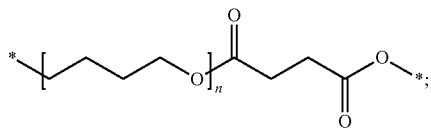

formula (1)

0.01 parts by mole to 0.40 parts by mole of a second structural unit, the second structural unit is represented by formula (2),

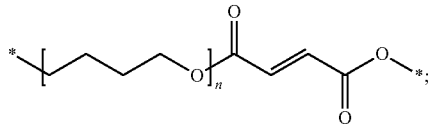

formula (2)

and
0.18 parts by mole to 0.22 parts by mole of a third structural unit, the third structural unit is represented by formula (3),

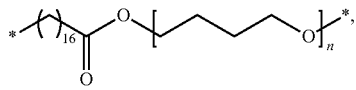

formula (3)

wherein n is a positive integer between 25 and 48.

* * * * *